Figures 1, 2:
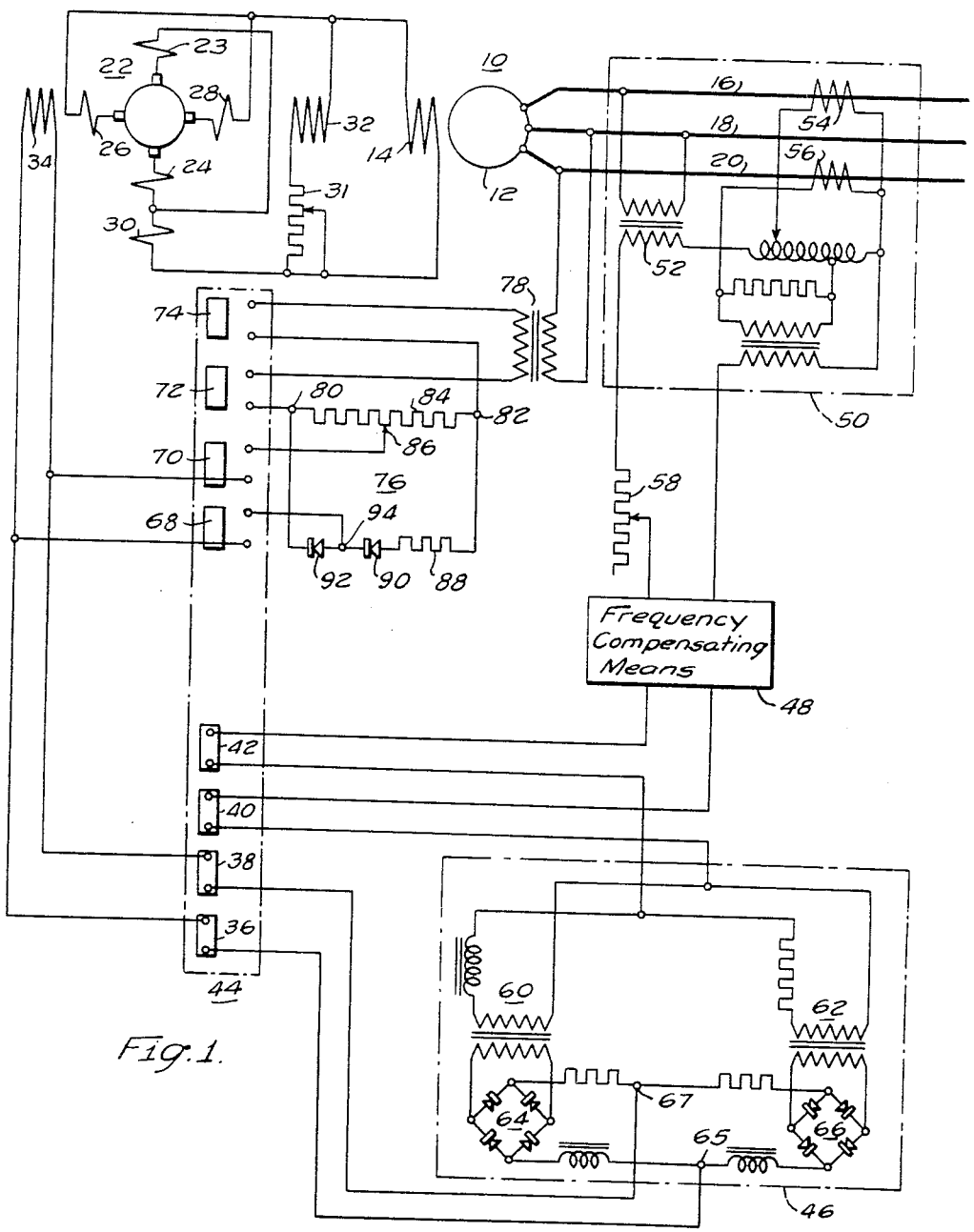

June 22, 1948.    H. M. RUSTEBAKKE    2,443,665
REGULATING SYSTEM
Filed July 31, 1946

WITNESSES:

INVENTOR
Homer M. Rustebakke.
BY
James K. Ely
ATTORNEY

Patented June 22, 1948

2,443,665

UNITED STATES PATENT OFFICE 2,443,665

REGULATING SYSTEM

Homer M. Rustebakke, Wilkinsburg, Pa., assignor to Westinghouse Electric Corporation, East Pittsburgh, Pa., a corporation of Pennsylvania Application July 31, 1946, Serial No. 687,486

2 Claims. (Cl. 322—28)

1

This invention relates to regulating systems.

An object of this invention is to provide in a regulating system which utilizes a self-excited exciter for controlling the excitation of a generator, for a manual control system operative when a sudden load is applied to the generator for automatically effecting a slow correction in the excitation of the exciter to tend to restore the generator voltage to normal, the manual control system being adjustable to effect forcing of the excitation of the exciter.

Another object of this invention is to provide in a regulating system which utilizes a self-excited exciter for controlling the excitation of an alternating current generator, for a manual control system operative when a sudden load is applied to the generator for automatically delivering a flow of direct current to a control field winding of the exciter to effect a slow correction in the excitation of the exciter to tend to restore the generator voltage to normal, the manual control system being adjustable to effect forcing of the excitation of the exciter.

Other objects of this invention will become apparent from the following description when taken in conjunction with the accompanying drawing in which:

Figure 1 is a diagrammatic representation of a regulating system embodying the teachings of this invention, and Fig. 2 is a graph the curve of which illustrates the operation of the regulating system of this invention when a load is applied to the alternating current generator.

Referring to the drawing, there is illustrated an alternating current generator 10 the voltage of which is to be regulated. The generator 10 comprises the armature windings 12 and the field windings 14, the armature windings 12 being connected for supplying a three-phase load circuit represented by conductors 16, 18 and 20. The field windings 14 are connected to be supplied from a rotary direct-current generator or self-excited exciter 22.

The self-excited exciter 22 schematically represented is of 4-pole construction having a plurality of field windings and is of the general construction and type disclosed and claimed in the copending application, Serial No. 607,440, filed July 27, 1945, in the name of W. R. Harding and A. W. Kimball, and assigned to the assignee of this invention. As disclosed therein, the exciter or rotary direct-current generator 22 has a number of pole pieces and an equal number of commutator brushes arranged to assume sequentially

2 positive and negative electrical potentials. In the embodiment schematically shown in the drawing, the positive brushes of the 4-pole machine are interconnected by an equalizing connection as are also the negative brushes of the machine.

The exciter generator 22 is provided with forcing fields 23 and 24 connected in series-circuit relation in one of the equalizing connections, the fields 23 and 24 being so divided as to constitute two groups of four windings each, a corresponding winding from each group being arranged on each of the four poles to be equally and sequentially excited by current flowing between the brushes. In addition to the forcing fields 23 and 24, the exciter generator 22 is also provided with compensating windings 26 and 28 disposed on two of the poles and self-sustaining or exciting field windings 30 and 32 which are so divided and positioned on all of the poles that the flux distribution of the self-excitation is symmetrical.

The field windings 30 are connected in series in the load circuit, whereas the field windings 32 are connected in shunt across the load circuit for the exciter generator 22, a calibrating resistance 31 being connected in series with the shunt fields. The series and shunt field windings of the exciter generator 22 may be cumulative with the series field windings 30 providing slightly less than required sustaining field strength and the shunt field 32 being only strong enough for adjusting to full self-excitation field strength to compensate for manufacturing differences and installation adjustment or the like. On the other hand, the shunt field windings 32 may be wound to oppose the series field windings 30 where the windings 30 supply slightly more than required sustaining field strength.

The series tuned exciter generator 22 is also provided with a control field winding 34 so wound as to provide equal windings on two of the poles to increase the strength of one while decreasing the strength of the other when energized to distort the flux distribution in the field structure in a degree depending upon the energization of the control field winding. By utilizing the control field winding 34 in the exciter generator 22, the plurality of field windings cooperate in the single machine, as disclosed in the Harding et al. application, Serial No. 607,740, identified hereinbefore, to give an extremely sensitive and quick response of generated voltage to changes of a comparatively weak input voltage while at the same time giving a high amplification ratio.

The control field winding 34 which is disposed to be normally deenergized when the generator 10 is operating to maintain a predetermined line voltage and to be directionally energized as the line voltage increases or decreases from the predetermined value under automatic regulation as described hereinafter to so control the exciter generator 22 as to correct the excitation of the generator 10 to correct for such departure and maintain the line voltage substantially at the predetermined value.

As illustrated, the control field winding 34 is disposed to be connected through segments 36, 38, 40 and 42 of a controller 44, a voltage reference network 46 and a frequency compensating means 48 to be supplied by the line voltage, a network 50 being utilized to derive a positive sequence component of the line voltage for supplying a measure of the line voltage.

The network 50 for deriving the positive sequence component of the line voltage is disclosed and claimed in the copending application of E. L. Harder, Serial No. 560,299, filed October 25, 1944, now Patent 2,426,018, dated August 19, 1947. Briefly, the network comprises the potential transformer 52 for deriving a single phase of the three-phase line voltage having no zero-sequence voltage-component and current transformers 54 and 56 which cause line current to pass through the impedance in the network in such a manner as to produce a voltage drop substantially corresponding to the negative-sequence line-voltage, and the voltage drop thus resulting is subtracted from the single phase of the line voltage to produce substantially the positive-sequence component to the line voltage. Other embodiments of the positive-sequence component network 50 are disclosed and claimed in the aforementioned application, Serial No. 560,299, and may be employed instead of the specific network 50 illustrated in the drawing.

An adjustable resistor 58 is connected in the output circuit from the network 50 from providing a voltage adjusting means. The frequency compensating means 48 may be any suitable arrangement of capacitors and inductance apparatus for accomplishing the purpose of compensating for frequency. As will be appreciated, in many cases the frequency of the line voltage will not fluctuate greatly, and it may not be necessary to utilize the compensating means 48, but instead the positive-sequence component of the line voltage from the network 50 will be supplied directly to the voltage reference network 46.

The voltage reference network illustrated is disclosed in detail in Patent No. 2,428,566, issued October 7, 1947 to E. L. Harder et al. and briefly comprises a non-linear impedance circuit 60 and a linear impendance circuit 62 connected to be simultaneously energized in accordance with the line voltage and, in particular, by the positive-sequence component of the line voltage. The non-linear impedance circuit 60 and the linear impedance circuit 62 are connected through insulating transformers across rectifying units 64 and 66, respectively, the output terminals of the rectifying units being connected in series-circuit relation with each other through suitable series-connected resistors and series-connected smoothing reactors. The control-field winding 34 of the exciter 22 is disposed to be connected through segments 36 and 38 across the direct-current series circuit connecting the rectifying units at points 65 and 67, respectively, which for the predetermined line voltage are at zero potential. The elements of the non-linear impedance circuit 60 and of the linear impedance circuit 62 have intersecting impedance characteristics and, as the line voltage fluctuates from the predetermined value, the current drawn by the circuits varies with the result that an unbalanced condition between the output of the rectifying units occurs and the control field winding 34 is energized in one or the other directions depending upon the direction of the unbalanced condition.

The controller 44 is also provided with segments 68, 70, 72 and 74 disposed to be actuated to a circuit closing position when segments 36, 38, 40 and 42 are actuated to a circuit opening position to connect the control field winding 34 to be energized from a manual control circuit 76 which is disposed to be connected by segments 72 and 74 through transformer 78 to be supplied from the alternating current load conductors 18 and 20.

The manual control circuit 76 comprises two parallel circuits connected between common taps or terminals 80 and 82 which are, in turn, disposed to be connected to segments 72 and 74, respectively. One of the parallel circuits comprises a resistor 84 having an intermediate adjustable tap 86; and the other of the parallel circuits comprises a resistor 88 and a pair of dry type rectifier units 90 and 92, such as copper-oxide rectifiers, the resistor 88, rectifier 90 and rectifier 92 being connected in series circuit relation with one another with a fixed tap or terminal 94 provided intermediate the rectifiers 90 and 92. The control field winding 34 of the exciter generator 22 is connected through segments 68 and 70 to taps 94 and 86, respectively.

In operation with the controller 44 in the position illustrated, and assuming that the generator 10 and self-excited and tuned exciter generator 22 are being driven by some suitable means (not shown) for supplying power at a constant voltage to a load (not shown), the windings 30 and 32 of the exciter generator 22 are sufficient for normally maintaining the excitation of the generator 10 to maintain constant voltage across the line conductors 16, 18 and 20. Under the constant voltage conditions of the line, the positive-sequence network 50 functions to deliver a positive-sequence component of the generator voltage to the frequency compensating means 48 and from thence to the network 46.

The non-linear impedance circuit 60 and the linear impedance circuit 62 are so selected that when the positive-sequence component of the predetermined line voltage is impressed upon the network 46, the circuits 60 and 62 have intersecting impedance characteristics and the voltages across rectifying units 64 and 66 and at the points 65 and 67 are equal and so balanced that a voltage drop does not appear across the control field winding 34.

If the line voltage should increase from the predetermined value, then the positive-sequence component delivered to the network 46 is increased, with the result that the non-linear impedance circuit 60 draws more current than the linear impedance circuit 62 and the output voltages across the rectifying units 64 and 66 are unbalanced. With such an unbalanced condition, the larger potential across the rectifying unit 64 effects a voltage drop across the control-field winding 34 in a direction to produce an action to oppose the excitation of the field windings 30 and 32 to decrease the output of the exciter generator 22 to decrease the excitation of the generator 10 to return the line voltage to the predetermined value.

If the change in the line voltage is a decrease, then the linear impedance circuit 62 draws more current than the non-linear impedance circuit 60 and the network is unbalanced to effect a voltage drop across the control field winding 34 in a direction to produce an action to aid the field windings 30 and 32 to increase the excitation of the exciter generator 22 and thereby effect an increase in the excitation of the generator 10 to maintain the line voltage as its predetermined value.

In many industrial and commercial applications, it is required that a manual control be utilized for a part of the regulating action instead of the automatic regulating operation just described. In such case, the controller 44 is actuated to move segments 36, 38, 40 and 42 to an open circuit position to disconnect the control field winding 34 from the network 46 and to actuate segments 68, 70, 72 and 74 to circuit closing position to connect the control field winding 34 to taps 86 and 94 of the manual control circuit 76 and the manual control circuit directly across the secondary windings of transformer 78.

The adjustable tap 86 is moved to a predetermined position whereby the voltage drop across the section of resistor 84 connected between taps 82 and 86 equals the voltage drop across the series connected resistor 88 and rectifier 90 between taps 82 and 94 when the generator 10 is operated to maintain the predetermined line voltage; and, consequently, with the field windings 30 and 32 supplying sufficient excitation for the exciter generator 22 to maintain a predetermined line voltage, the field current in the control field winding 34 is zero.

In operation, if a reactive load is suddenly applied to the generator 10, such loads are accompanied by a transient increase in current flowing in the field winding 14 of generator 10 which, in turn, causes a transient increase in the current flowing in the series-field winding 30 of exciter generator 22. If the transient field currents in the field windings 30 and 14 could be maintained at their initial values reached after a brief subtransient interval, steady operation of the generator 10 under the sudden load would be obtained without voltage drop increasing beyond transient reactance drop, and the current would be maintained at the transient value providing high current for circuit breaker coordination. The characteristics of the self-excited exciter generator 22 are such that the exciter generator tends to sustain the high transient value of field current, since the transient current in the field winding 30 tends to effect an increase in the voltage output of exciter 22, to sustain the excitation of generator 10 at its transient value.

Now, with the manual control circuit 76 connected to be responsive to changes in load-circuit conditions as described, the adjustable tap 86 having been adjusted to so connect the portion of resistor 84 in circuit between taps 80 and 86 that the voltage drop thereacross equals that across rectifier 92 and no current flows through control field winding 34, the load suddenly applied effects a decrease in the voltage across load conductors 18 and 20 with the result that the voltage drop across the section of the resistor 84 between taps 80 and 86 decreases and becomes less than that across rectifier 92. In this connection it is to be noted that the rectifiers 90 and 92 can be considered as substantially constant potential devices as the forward potential drop across the individual rectifiers is substantially constant as the current therethrough changes. With the change in the potential drop between taps 80 and 86 as described hereinbefore, current flows from tap 94 through segment 68, control field winding 34 and segment 70 to adjustable tap 86 to produce an excitation that is cumulative to the excitation effect of windings 30 and 32 to cause a drift of the voltage of the exciter generator 22 to a value approaching that necessary to return and maintain the voltage of generator 10 at the predetermined regulated value.

As will be apparent under such operating conditions the rectifiers 90 and 92 cooperate to insure the flow of current in the correct direction in the control field winding 34. For example during the half cycle that common tap 80 is positive and tap 82 is negative, no current can flow in control field winding 34 from tap 94 to tap 86 as the rectifier 92 blocks such flow and at the same time rectifier 90 blocks the flow of current in the opposite direction. For the other half cycle where tap 82 is positive with respect to tap 80 and the drop between taps 80 and 86 is less than the drop across rectifier 92 then rectifier 90 permits the flow of current from tap 94 through the control field winding 34 to tap 86 to produce the described cumulative excitation.

Referring to Fig. 2, curve 96 illustrates the corrective action of the manual control circuit 76 when load is applied to the generator 10. As will be apparent the corrective action is in the right direction and prevents the voltage dip from materially exceeding the transient reactance drop even if the operator is not in attendance but where the system is connected for manual control.

Where it is desired to force a quick manual correction in the voltage output of the exciter generator 22 to maintain the excitation of generator 10 at a value to maintain the regulated voltage, instead of depending on the relatively slow automatic regulating action of the manual control circuit as described hereinbefore, the quick forcing action may be obtained by so adjusting the position of adjustable tap 86 along resistor 84 that the potential drop between taps 80 and 86 is greatly reduced with respect to the substantially constant potential drop across rectifier 92 to increase the flow of current from tap 94 through the control field winding 34 to tap 86 to produce an excitation that is cumulative to the excitation effect of windings 30 and 32 to quickly increase the excitation of generator 10 to maintain the output therefrom at the predetermined value.

If the change in load is such as to effect an increase in the voltage across conductor 18 and 20 when the manual control circuit 76 is adjusted to maintain the normal predetermined voltage, then the potential drop across the resistor section between taps 80 and 86 increases with respect to the drop across rectifier 92 and current flows from tap 86 through segment 70, control field winding 34 and segment 68 to tap 94 to produce an action to oppose the excitation effect of field windings 30 and 32 to decrease the output from the exciter generator 22 and consequently decrease the output of the generator 10.

As in the previous instance, the relatively slow automatic regulation can be superseded by a manual adjustment of the position of tap 86 to greatly increase the potential drop across the resistor section between taps 80 and 86 with respect to the potential drop across the rectifier 92 with the result that the current flow from tap 86 through field winding 34 to tap 94 is greatly increased to oppose the excitation effect of windings 30 and 32 to effect a reduction in the voltage of generator 10 to the predetermined value.

The manual control circuit 76 is constructed of standard elements and can be readily duplicated. The fact that the rectifiers 90 and 92 are utilized as an integral part of the circuit eliminates the necessity for additional rectifiers where the system is used to regulate an alternating current generator and simplifies the adjunct equipment to a minimum. Such a manual control system insures a slow automatic drift of regulation in the right direction to maintain normal regulated generator voltage and has an excellent settling ability for good stability. Further, where required a fast forcing action can be obtained as described.

I claim as my invention:

1. In a regulating system for a dynamo-electric machine disposed to supply a load circuit, in combination, an exciter for supplying the field excitation of the dynamo-electric machine, a control field winding for the exciter disposed to be directionally energized, a manual control circuit consisting of a pair of circuits connected in parallel circuit relation between common taps disposed to be supplied from the load circuit, one of the parallel circuits comprising a resistor having an adjustable tap connection disposed between the common taps, the other of the parallel circuits consisting of a resistor and two rectifier units connected in series circuit relation with a fixed tap between the rectifier units, the control field winding being connected across the fixed tap and the adjustable tap connection of the parallel circuits to be directionally energized in accordance with the potential at said taps, the adjustable tap being disposed for movement to provide a balance in potential at the adjustable tap and the fixed tap for a predetermined condition on the load circuit whereby the energization of the control field winding is zero, the manual control circuit being automatically operative upon a departure from the predetermined condition on the load circuit to deliver a directionally controlled direct current to the control field winding depending upon the direction of the departure, the adjustable tap connection also being operative to effectively force a directional energization of the control field winding.

2. In a regulating system for a dynamo-electric machine disposed to supply an alternating current load circuit, in combination, an exciter for supplying the field excitation of the dynamo-electric machine, the exciter having a self-energizing field winding for normally supplying the field excitation thereof and a control field winding disposed to be directionally energized, a manual control circuit consisting of a pair of circuits connected in parallel circuit relation between common taps disposed to be supplied with alternating current from the load circuit, one of the parallel circuits comprising a resistor having an adjustable tap connection disposed between the common taps, the other of the parallel circuits comprising a resistor and a plurality of means for controlling the direction of flow of current, the resistor and plurality of means being connected in series circuit relation with a fixed tap between two of said plurality of means, the control field winding being connected across the fixed tap and the adjustable tap connection of the parallel circuits to be directionally energized in accordance with the potential at said taps, the adjustable tap being disposed for movement to provide a balance in potential at the adjustable tap and the fixed tap for a predetermined condition on the load circuit whereby the energization of the control field winding is zero, the manual control circuit being automatically operative upon a departure from the predetermined condition on the load circuit to deliver a directionally controlled flow of direct current to the control field winding depending upon the direction of the departure, the adjustable tap connection also being operative to effectively force a directional energization of the control field winding.

HOMER M. RUSTEBAKKE.